US012220371B2

(12) United States Patent
Sanna Pinto

(10) Patent No.: US 12,220,371 B2
(45) Date of Patent: Feb. 11, 2025

(54) AIR SUCTION STIMULATOR

(71) Applicant: SHENZHEN MG TECHNOLOGY CO., LTD, Shenzhen (CN)

(72) Inventor: Victor Shelton Sanna Pinto, São Paulo (BR)

(73) Assignee: SHENZHEN MG TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 18/732,574

(22) Filed: Jun. 3, 2024

(65) Prior Publication Data

US 2024/0315919 A1 Sep. 26, 2024

(30) Foreign Application Priority Data

Apr. 3, 2024 (CN) ........................ 202420681741.X

(51) Int. Cl.
*A61H 19/00* (2006.01)
*A61H 9/00* (2006.01)

(52) U.S. Cl.
CPC ........... *A61H 19/50* (2013.01); *A61H 9/0057* (2013.01); *A61H 19/30* (2013.01); *A61H 2201/0153* (2013.01); *A61H 2201/1215* (2013.01); *A61H 2201/1602* (2013.01)

(58) Field of Classification Search
None
See application file for complete search history.

(56) References Cited

U.S. PATENT DOCUMENTS

| | | | | |
|---|---|---|---|---|
| 11,833,100 | B1 * | 12/2023 | Liu | A61H 9/0057 |
| 2016/0096033 | A1 | 4/2016 | Kobayashi | |
| 2016/0128895 | A1 | 5/2016 | Kobayashi | |
| 2021/0196556 | A1 * | 7/2021 | Fuster | A61H 7/008 |
| 2021/0213280 | A1 | 7/2021 | Kuwahata | |
| 2024/0122786 | A1 * | 4/2024 | Yu | A61H 9/0057 |
| 2024/0238154 | A1 * | 7/2024 | Liu | A61H 9/005 |
| 2024/0252383 | A1 * | 8/2024 | Liufu | A61H 7/007 |
| 2024/0252384 | A1 * | 8/2024 | Zhou | A61H 7/005 |

* cited by examiner

*Primary Examiner* — Valerie L Woodward
*Assistant Examiner* — Paige Kathleen Bugg
(74) *Attorney, Agent, or Firm* — Hemisphere Law, PLLC; Zhigang Ma

(57) ABSTRACT

Disclosed is an air suction stimulator. A suction head is formed by components, located at a suction opening, of a sleeve, and the suction head is driven by a drive component to perform suction to simulate an effect of sucking sensitive positions, such that a more gentle and pleasant suction experience is provided to improve the sexual quality.

6 Claims, 6 Drawing Sheets

AIR SUCTION STIMULATOR

BACKGROUND OF THE INVENTION

Technical Field

The invention relates to the technical field of adult products, in particular to an air suction stimulator.

Description of Related Art

Adult products, such as BDSM products, sexy lingerie, stimulators, etc., are sexual aid products for providing sexual assistance for adults, and they not only can improve the sexual interest and quality, but also can bring a positive effect on sexual health. Particularly, the stimulators, which mainly include egg vibrators, dildos, vibration devices and delay masturbators, mainly function for stimulating sensitive positions of human bodies to allow users to come to a sexual climax more directly and quickly to further assist the course of sex.

At present, most existing stimulators generate vibrations at different frequencies by means of motors to stimulate sensitive positions repeatedly to fulfill a corresponding pleasant sensation. However, such stimulators are too normal, with the stimulation effect on sensitive positions of human bodies having become weaker gradually, and thus cannot provide better sexual stimulation anymore. During sex, suction is an action that can bring an extremely good simulation effect, and particularly for women, suction of some specific sensitive positions can bring a sexual climax easily. During sex, suction is performed with people's mouth, which will inevitably cause physical exhaustion and difficulties. Therefore, it is necessary to provide a stimulator that can simulate the suction action to improve the sexual quality for users.

BRIEF SUMMARY OF THE INVENTION

In view of the defects existing in the prior art, the objective of the invention is to provide an air suction stimulator that can simulate the suction action.

To fulfill the above objective, the invention adopts the following technical solution:

An air suction stimulator comprises a sleeve and a main part, wherein the sleeve is made from soft colloid and wraps around the main part, a suction opening is formed in an end of the main part, and a suction portion received in the suction opening is arranged on the sleeve corresponding to the suction opening; a drive component, a mainboard and a battery electrically connected to the mainboard are arranged in the main part; the drive component comprises a motor, a turnplate, a first movable arm and a second movable arm; the turnplate is oval, a first shaft rod is fixedly connected to an end surface of the turnplate, and two ends of the first shaft rod are rotatably mounted on a wall of an inner cavity of the main part; a middle portion of the first movable arm and a middle portion of the second movable arm are hinged together by means of second shaft rod, and two ends of the second shaft rod are connected to the wall of the inner cavity of the main part; one end of the first movable arm and one end of the second movable arm respectively abut against upper and lower edges of the turnplate and are provided with a tension spring, and under the action of the tension spring, the first movable arm and the second movable arm keep abutting against the turnplate; the other end of the first movable arm and the other end of the second movable arm are arranged at the suction opening and attached to the suction portion; and the motor is connected to the mainboard and is connected to the turnplate by means of a gear set to drive the turnplate to rotate.

Preferably, suspension lugs are arranged at the ends, provided with the tension spring, of the first movable arm and the second movable arm, arc-shaped grooves are formed in side faces of the first movable arm and the second movable arm, two ends of each of the tension spring are hung on the corresponding suspension lugs respectively, and side faces of the tension spring are attached into the arc-shaped grooves.

Preferably, the gear set comprises a crown gear arranged on the turnplate and a vertical gear arranged on a rotating head of the motor, and the vertical gear meshes with the crown gear.

Preferably, insertion cavities are formed in the sleeve located on an inner end surface of the suction portion, and the ends, close to the suction portion, of the first movable arm and the second movable arm are inserted into the insertion cavities.

Preferably, a raised convex ring is arranged on the sleeve located on an edge of the suction portion.

Preferably, tubular columns are arranged on an inner wall of the main part, the two ends of the first shaft rod are inserted into the tubular columns respectively, and clearances are reserved between the tubular columns and the first shaft rod.

By adopting the above technical solution, a suction head is formed by components, located at the suction opening, of the sleeve, and the drive component drives the suction head to perform suction to simulate an effect of sucking sensitive positions, such that a more gentle and pleasant suction experience is provided to improve the sexual quality; suction can be performed without physical power, thus reducing the physical output of users; moreover, the main part is comprehensively wrapped by the sleeve made from soft colloid, and there is no clearance at the joint of the suction head and the main part, such that the waterproofness of the main part is effectively guaranteed, and liquid will not enter the main part in use.

DETAILED DESCRIPTION OF THE INVENTION

To gain a better understanding of the objectives, technical solutions and advantages of the invention, the invention is described in further detail below in conjunction with accompanying drawings and embodiments. It should be understood that the specific embodiments described below are merely used for explaining the invention and are not used for limiting the invention In the description of the invention, it should be understood that terms such as “center”, “longitudinal”, “transverse”, “length”, “width”, “thickness”, “upper”, “lower”, “front”, “back”, “left”, “right”, “vertical”, “horizontal”, “top”, “bottom”, “inner”, “outer”, “clockwise” and “anticlockwise” are used for indicating directional or positional relations based on the accompanying drawings merely for the purpose of facilitating and simplifying the description of the invention, do not indicate or imply that devices or elements referred to must be in a specific direction or be configured and operated in a specific direction, and thus should not be construed as limitations of the invention. In addition, terms “first” and “second” are merely for the purpose of description, and should not be construed as indicating or implying relative importance or implicitly indicating the number of technical features referred to. Therefore, a feature defined by “first” or second” may explicitly or implicitly indicate the inclusion of one or more said features. In the description of the invention, “multiple” means two or more, unless otherwise clearly and expressly defined.

In the description of the invention, it should be noted that, unless otherwise expressly stated and defined, terms “mount”, “link” and “connect” should be broadly understood. For example, “connect” may refer to fixed connection, detachable connection or integrated connection; or, mechanical connection or electrical connection; or, direct connection, or indirect connection by means of an intermediate medium, or internal connection or interaction of two elements. Those ordinarily skilled in the art can appreciate the specific meanings of these terms in the invention as the case may be.

Figure 1:
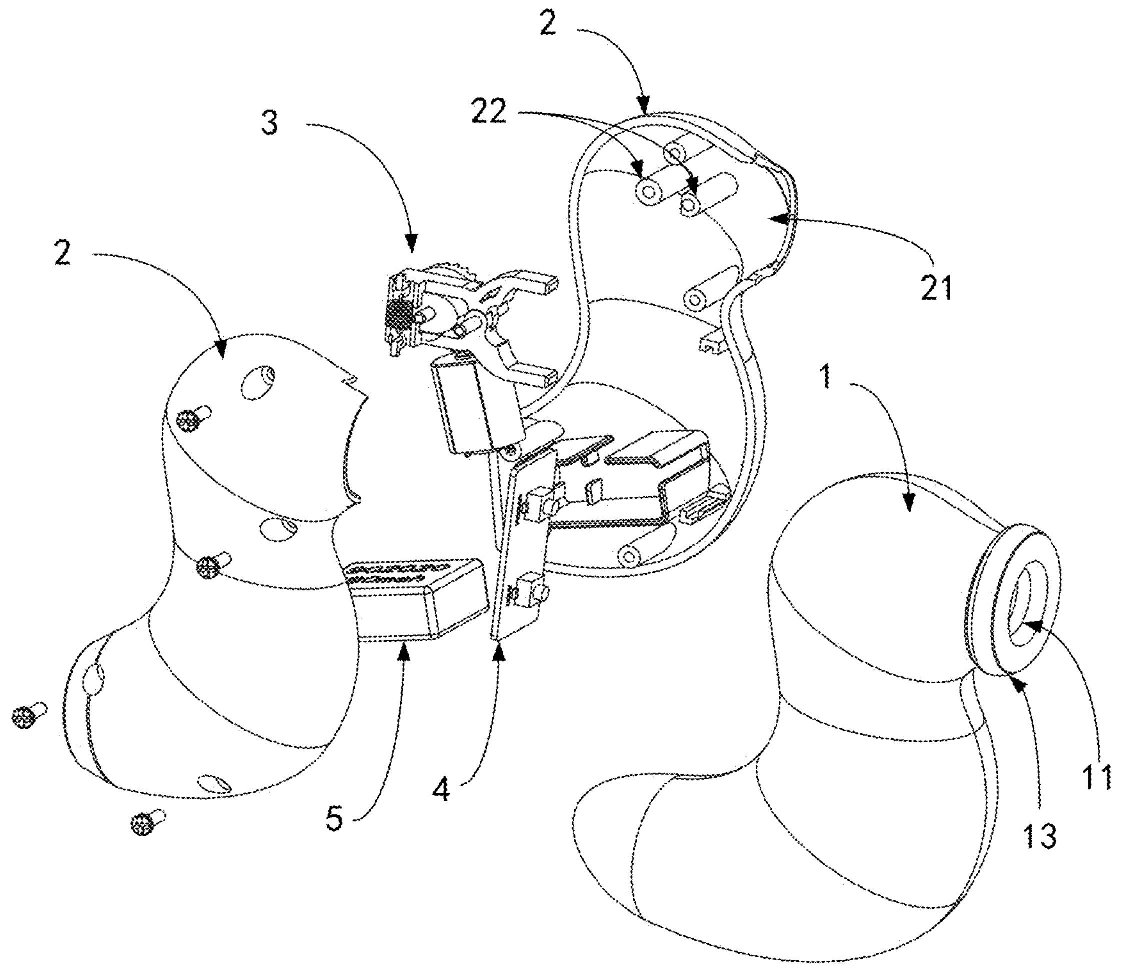
FIG. 1 is an exploded structural view according to one embodiment of the invention.
Figure 2:
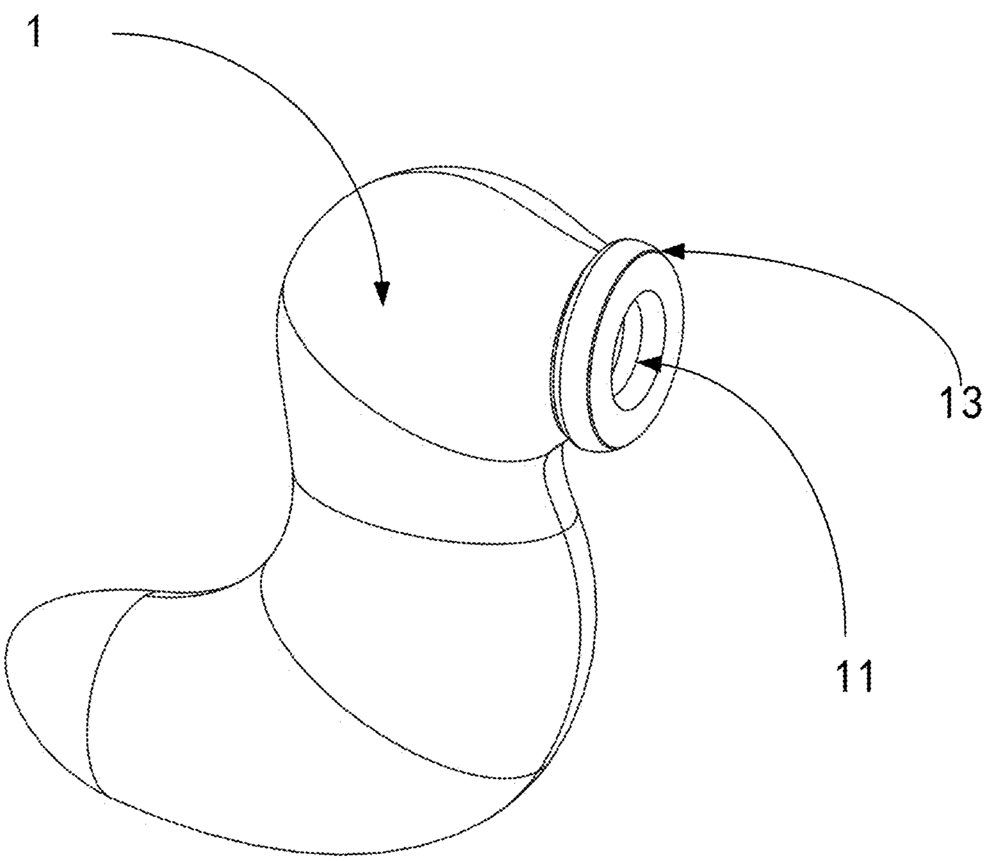
FIG. 2 is a perspective structural view according to one embodiment of the invention.
Figure 3:
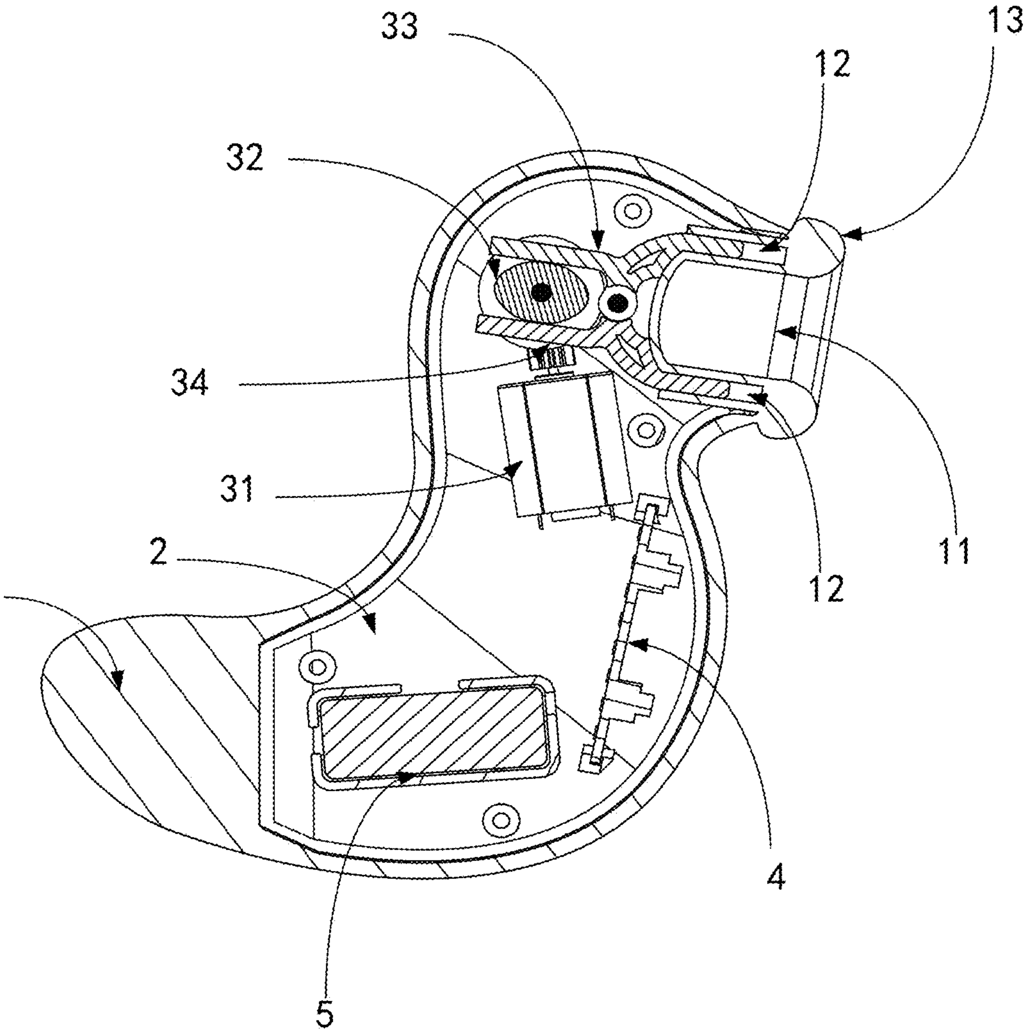
FIG. 3 is a sectional view according to one embodiment of the invention.
Figure 4:
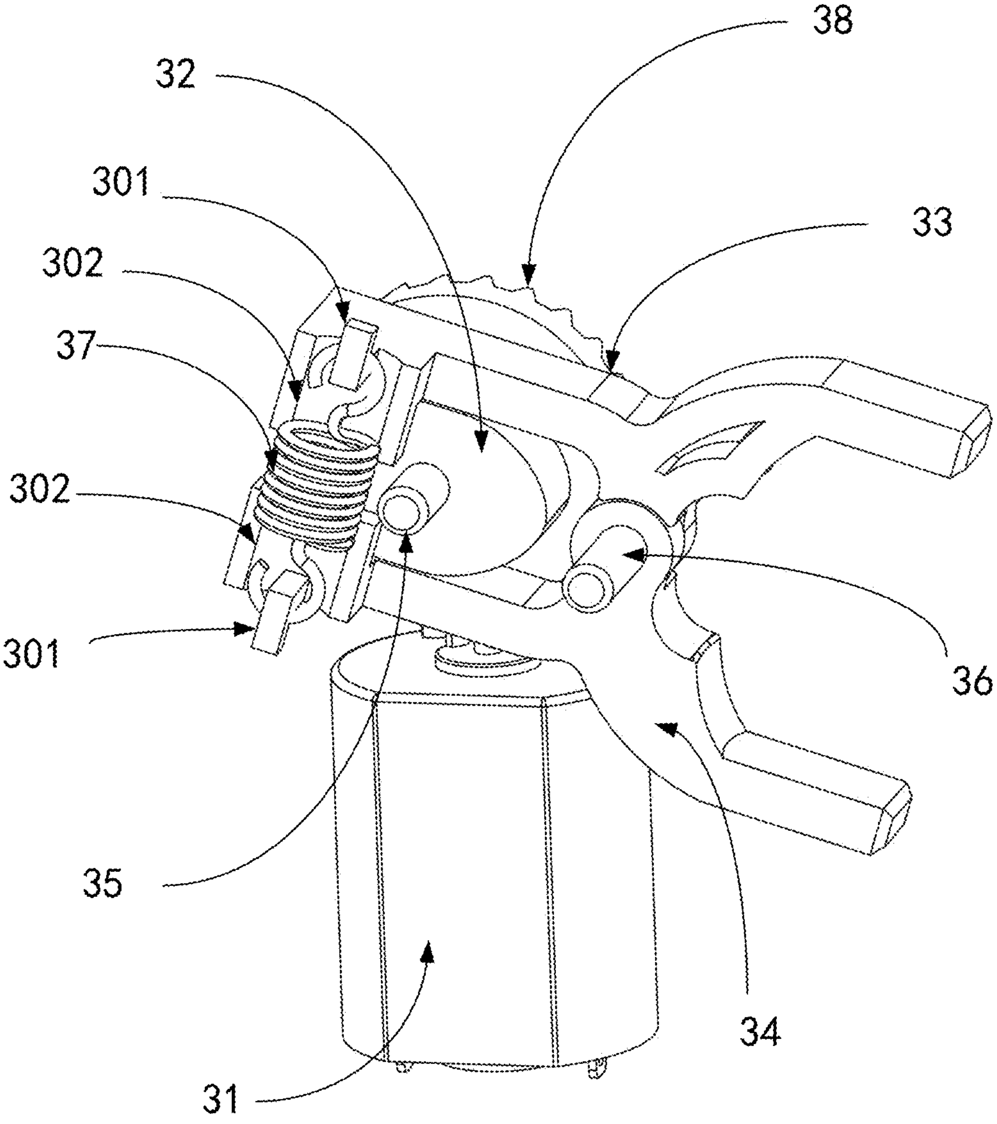
FIG. 4 is a structural view of a drive component in an open state according to one embodiment of the invention.
Figure 5:
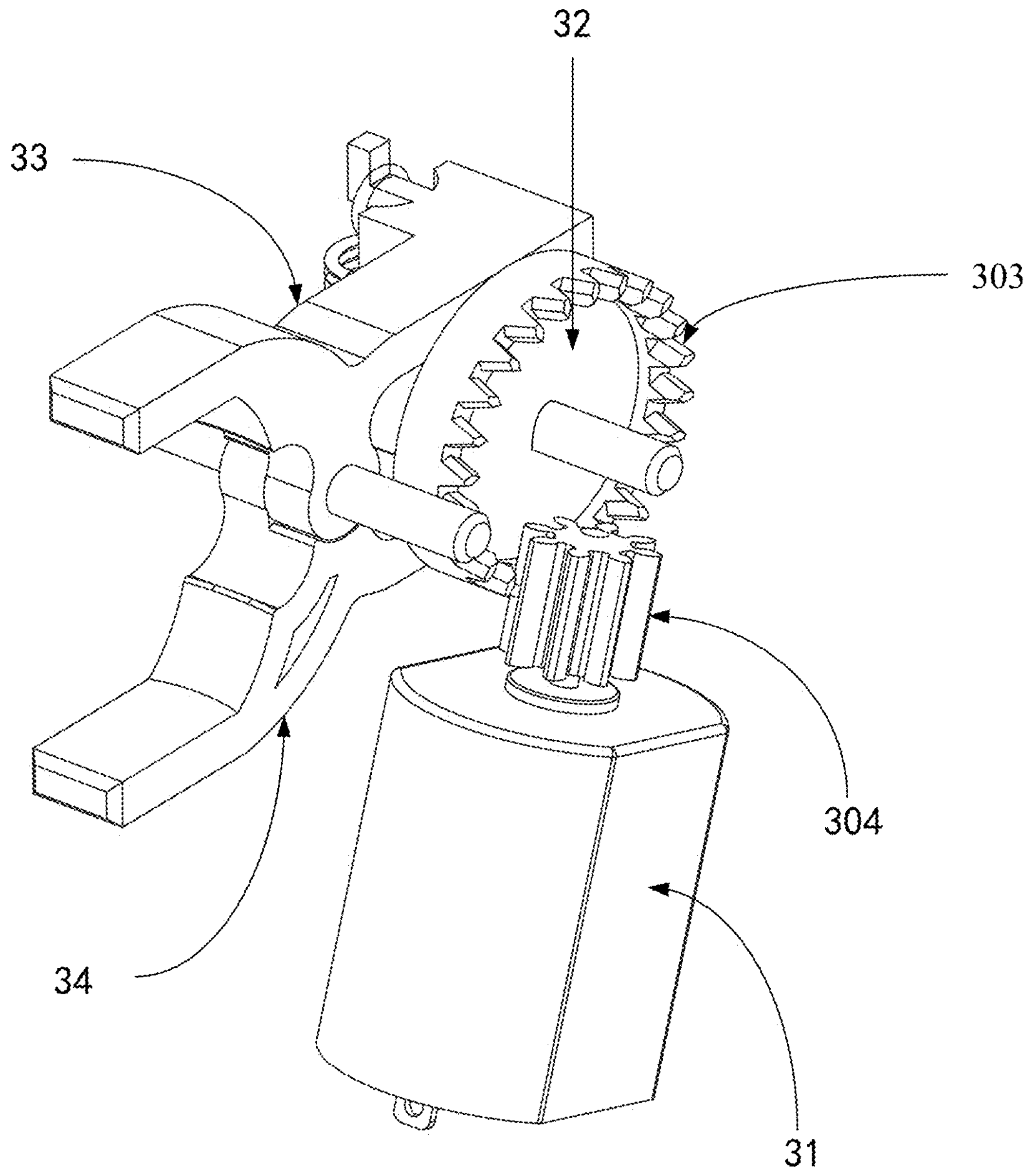
FIG. 5 is a structural view of the drive component in another direction according to one embodiment of the invention.
Figure 6:
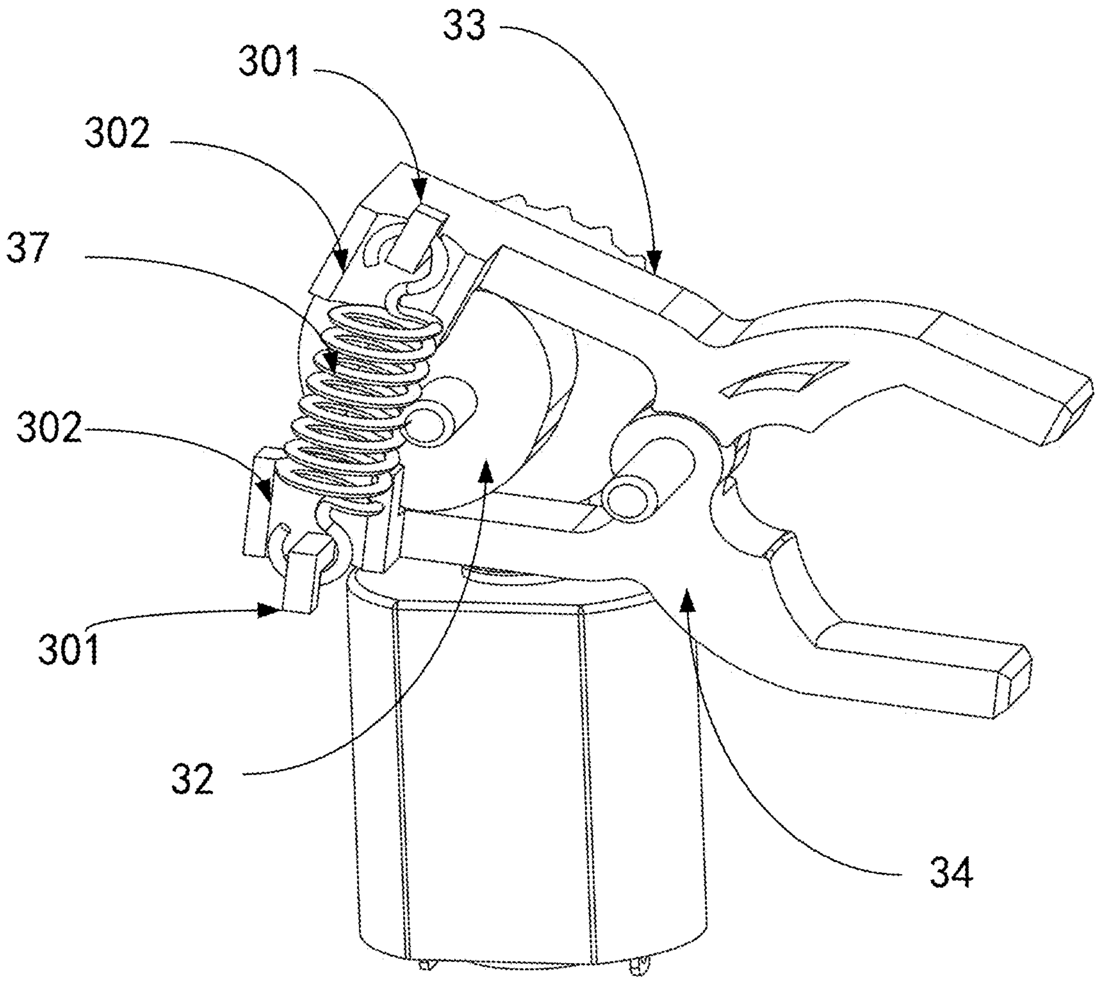
FIG. 6 is a structural view of the drive component in a closed state according to one embodiment of the invention.

As shown in FIG. 1-FIG. 6, this embodiment provides an air suction stimulator, comprising a sleeve 1 and a main part 2, wherein the sleeve 1 is made from soft colloid such as silica gel and wraps around the main part 2, a suction opening 21 is formed in one end of the main part 2, and a suction portion 11 received in the suction opening 21 is arranged on the sleeve 1 corresponding to the suction opening 21; a drive component 3, a mainboard 4 and a battery 5 electrically connected to the mainboard 4 are arranged in the main part 2; the drive component 3 comprises a motor 31, a turnplate 32, a first movable arm 33 and a second movable arm 34; the turnplate 32 is oval, a first shaft rod 35 is fixedly connected to an end surface of the turnplate 32, and two ends of the first shaft rod 35 are rotatably mounted on a wall of an inner cavity of the main part 2; a middle portion of the first movable arm 33 and a middle portion of the second movable arm 34 are hinged together by means of a second shaft rod 36, and two ends of the second shaft rod 36 are connected to the wall of the inner cavity of the main part 1; one end of the first movable arm 33 and one end of the second movable arm 34 respectively abut against upper and lower edges of the turnplate 32 and are provided with a tension spring 37, and under the action of the tension spring 37, the first movable arm 33 and the second movable arm 34 keep abutting against the turnplate 32; the other end of the first movable arm 33 and the other end of the second movable arm 34 are arranged at the suction opening 21 and attached to the suction portion 11; and the motor 31 is connected to the mainboard 4 and is connected to the turnplate 32 by means of a gear set 38 to drive the turnplate 32 to rotate.

In this embodiment, a suction head is formed mainly by components, located at the suction opening 21, of the sleeve 1 (the suction head is mainly formed by the suction portion 1, and the first movable arm 33 and the second movable arm 34 of the drive component 3), and the drive component 3 drives the suction head to perform suction to simulate an effect of sucking sensitive positions, such that a more gentle and pleasant suction experience is provided to improve the sexual quality; suction can be performed without physical power, thus reducing the physical output of users; moreover, the main part 2 is comprehensively wrapped by the sleeve 1 made from soft colloid, and there is no clearance at the joint of the suction head and the main part 2, such that the waterproofness of the main part 2 is effectively guaranteed, and liquid will not enter the main part 2 in use.

During specific operation of the air suction stimulator in this embodiment, the motor 31 provides power, the power provided by the motor 31 is transmitted by the gear set 38 to drive the turnplate 32 to rotate, and when the long-axis region of the oval turnplate abuts against the first movable arm 33 and the second movable arm 34, the other end of the first movable arm 33 and the other end of the second movable arm 34 will be closed, that is, the other end of the first movable arm 33 and the other end of the second movable arm 34 will move close to each other, and at this moment, the suction portion 11 of the sleeve 1 will be forced to deform (in the form of a flat opening); when the short-axis region of the turnplate 32 abuts against the first movable arm 33 and the second movable arm 34, the first movable arm 33 and the second movable arm 34 will restore under the action of the tension spring 37, and the other end of the first movable arm 33 and the other end of the second movable arm 34 will be in an open state, that is, the other end of the first movable arm 33 and the other end of the second movable arm 34 move away from each other, and at this moment, the suction portion 11 of the sleeve 1 will return to the original shape. By performing the above action repeatedly, an air suction effect (suction effect) can be realized to simulate the suction action with the mouth. By placing the suction portion 11 to a sensitive position of the human body (such as the clitoris), users can enjoy a pleasant sensation brough by suction.

Further, to prevent the tension spring 37 from dislocation or disconnection during the repeated movement process, in this embodiment, suspension lugs 301 are arranged at the ends, provided with the tension spring 37, of the first movable arm 33 and the second movable arm 34, arc-shaped grooves 302 are formed in side faces of the first movable arm 33 and the second movable arm 34, two ends of the tension spring 37 are hung on the corresponding suspension lugs 301 respectively, and side faces of the tension spring 37 are attached into the arc-shaped grooves 302. In this way, the tension spring 37 can be limited to some extent when stretched or restored, thus realizing a stable connection effect when the tension spring 37 are deformed.

Further, because the main part 2 in this embodiment is a handheld massager and has a limited internal space, to realize staggered installation of the motor 31 and the turnplate 32, the gear set 38 in this embodiment comprises a crown gear 303 arranged on the turnplate 32 and a vertical gear 304 arranged on a rotating head of the motor 31, and the vertical gear 304 meshes with the crown gear 303. In this way, the motor 31 and the turnplate 32 can be arranged in the vertical direction, and the rotating force from the motor 31 can be smoothly transmitted to the turnplate 32.

Further, as for the connection structure between the first movable arm 33 and the suction portion 11 as well as between the second movable arm 34 and the suction portion 11, to ensure that the suction portion 11 can be driven to deform when the first movable arm 33 and the second movable arm 34 are closed or opened, in this embodiment, insertion cavities 12 are formed in the sleeve 1 located on an inner end surface of the suction portion 11, and the ends, close to the suction portion 11, of the first movable arm 33 and the second movable arm 34 are inserted into the insertion cavities 12. In this way, the suction portion 11 can be driven to deform correspondingly as long as the first movable arm 33 and the second movable arm 34 move.

Further, to improve the massage effect on muscles, in this embodiment, a raised convex ring 13 is arranged on the sleeve 1 located on an edge of the suction portion 11. During the deformation process of the suction portion 13, the convex ring 13 can improve the negative-pressure suction effect and the sense of touch.

Further, the two ends of the first shaft rod are rotatably mounted on the wall of the inner cavity of the main part 2. Specifically, tubular columns 22 may be arranged on an inner wall of the main part 2, the two ends of the first shaft rod 35 are inserted into the tubular columns 22 respectively, and clearances are reserved between the tubular columns 22 and the first shaft rod 35. In order to improve the rotation stability, shaft sleeves may be arranged in the tubular columns 22. The second shaft rod 36 may also be connected to the main part 2 by means of tubular columns 22, and in this case, because rotation does not need to be into account in design, the tubular columns 22 may be in interference fit with the second shaft rod 36.

In addition, in this embodiment, the battery 5 may be a rechargeable battery, a charging port is arranged on the mainboard 4, and because the charging port is uncovered, a soft rubber plug is arranged on the sleeve 1 corresponding to the charging port to fulfill a waterproof effect; in addition, suction is controlled to be started and stopped by an operator. For example, a key is arranged on the mainboard 4, a hole for giving way to the key is formed in the main part 2, and the press head of the key abuts against the inner end surface of the sleeve 1, such that the requirement for arranging a key can be met, and a waterproof effect can be fulfilled at the same time. Of course, other structural designs such as a touch switch can also be adopted, and this embodiment has no limitation in this aspect.

The above embodiments are merely preferred ones of the invention, and are not intended to limit the patent scope of the invention. All equivalent structures or flow transformations made based on the contents in the specification and drawings of the invention, or direct or indirect applications to other related technical fields should also fall within the patent protection scope of the invention.

What is claimed is:

1. An air suction stimulator, comprising a sleeve and a main part, wherein the sleeve is made from soft colloid and wraps around the main part, a suction opening is formed in an end of the main part, and a suction portion received in the suction opening is arranged on the sleeve corresponding to the suction opening; a drive component, a mainboard and a battery electrically connected to the mainboard are arranged in the main part; the drive component comprises a motor, a turnplate, a first movable arm and a second movable arm; the turnplate is oval, a first shaft rod is fixedly connected to an end surface of the turnplate, and two ends of the first shaft rod are rotatably mounted on a wall of an inner cavity of the main part; a middle portion of the first movable arm and a middle portion of the second movable arm are hinged together by means of a second shaft rod, and two ends of the second shaft rod are connected to the wall of the inner cavity of the main part; one end of the first movable arm and one end of the second movable arm respectively abut against an upper edge and a lower edge of the turnplate and are provided with a tension spring, and under an action of the tension spring, the first movable arm and the second movable arm keep abutting against the turnplate; an opposite end of the first movable arm and the other end of the second movable arm are arranged at the suction opening and attached to the suction portion; and the motor is connected to the mainboard and is connected to the turnplate by means of a gear set to drive the turnplate to rotate.

2. The air suction stimulator according to claim 1, wherein suspension lugs are arranged at the ends provided with the tension spring of the first movable arm and the second movable arm of the first movable arm and the second movable arm, arc-shaped grooves are formed in side faces of the first movable arm and the second movable arm, two ends of the tension spring are hung on corresponding suspension lugs respectively, and side faces of the tension spring are attached into the arc-shaped grooves.

3. The air suction stimulator according to claim 1, wherein the gear set comprises a crown gear arranged on the turnplate and a vertical gear arranged on a rotating head of the motor, and the vertical gear meshes with the crown gear.

4. The air suction stimulator according to claim 1, wherein insertion cavities are formed in the sleeve located on an inner end surface of the suction opening, and the opposite ends close to the suction portion of the first movable arm and the second movable arm are inserted into the insertion cavities.

5. The air suction stimulator according to claim 4, wherein a raised convex ring is arranged on the sleeve located on an edge of the suction portion.

6. The air suction stimulator according to claim 1, wherein tubular columns are arranged on an inner wall of the main part, the two ends of the first shaft rod are inserted into the tubular columns respectively, and clearances are reserved between the tubular columns and the first shaft rod.

* * * * *